US012618313B2

(12) United States Patent
Shetty et al.

(10) Patent No.: US 12,618,313 B2
(45) Date of Patent: May 5, 2026

(54) SUBSURFACE CONDITION DETECTION USING TUBE WAVES IN A MULTI-WELL SYSTEM

(71) Applicant: Halliburton Energy Services, Inc., Houston, TX (US)

(72) Inventors: Dinesh Ananda Shetty, Houston, TX (US); Zhijie Sun, Houston, TX (US); Derek Shelby Bale, Houston, TX (US); Rajani Prakash Satti, Houston, TX (US); Erik Lee, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/920,567

(22) Filed: Oct. 18, 2024

(65) Prior Publication Data

US 2025/0369324 A1 Dec. 4, 2025

Related U.S. Application Data

(60) Provisional application No. 63/654,764, filed on May 31, 2024, provisional application No. 63/653,279, filed on May 30, 2024.

(51) Int. Cl.
*E21B 43/26* (2006.01)
*E21B 47/16* (2006.01)
(Continued)

(52) U.S. Cl.
CPC .............. *E21B 43/26* (2013.01); *E21B 47/16* (2013.01); *E21B 49/00* (2013.01); *G01V 1/282* (2013.01); *G01V 1/305* (2013.01)

(58) Field of Classification Search
CPC ...... E21B 43/26; E21B 47/107; E21B 47/095; E21B 47/06; E21B 49/00; E21B 47/14; E21B 47/00; E21B 47/16
See application file for complete search history.

(56) References Cited

U.S. PATENT DOCUMENTS 4,993,491 A 2/1991 Palmer et al.
5,441,340 A 8/1995 Cedillo et al.
(Continued)

FOREIGN PATENT DOCUMENTS

CA 3221947 1/2018
CA 3034253 C * 1/2021 .............. G01V 1/50
(Continued)

OTHER PUBLICATIONS

"U.S. Appl. No. 16/668,791 Final Office Action", Jul. 12, 2021, 14 pages.
(Continued)

*Primary Examiner* — Zakiya W Bates
(74) *Attorney, Agent, or Firm* — DeLizio, Peacock, Lewin & Guerra LLP

(57) ABSTRACT

Techniques for determining subsurface conditions in a multi-well system may include detecting, at time $t_1$, a tube wave at a first well system of the multi-well system. The techniques may further include detecting, at time $t_2$, the tube wave at a second well system of the multi-well system. The techniques may further include determining a time differential $t_d$ between $t_1$ and $t_2$. The techniques may further include determining, based at least in part on $t_d$, that the first well system and the second well system are in fluid communication via a formation.

20 Claims, 8 Drawing Sheets

(51) Int. Cl.
    *E21B 49/00*    (2006.01)
    *G01V 1/28*    (2006.01)
    *G01V 1/30*    (2006.01)

(56) References Cited

U.S. PATENT DOCUMENTS

| | | |
|---|---|---|
| 6,439,310 B1 | 8/2002 | Scott, III et al. |
| 6,795,773 B2 | 9/2004 | Soliman et al. |
| 6,935,424 B2 | 8/2005 | Lehman et al. |
| 7,210,528 B1 | 5/2007 | Brannon et al. |
| 7,377,319 B2 | 5/2008 | Patterson |
| 7,451,812 B2 | 11/2008 | Cooper et al. |
| 7,451,820 B2 | 11/2008 | Albers et al. |
| 7,516,793 B2 | 4/2009 | Dykstra |
| 7,673,507 B2 | 3/2010 | Walters et al. |
| 7,938,181 B2 | 5/2011 | Dusterhoft et al. |
| 8,126,646 B2 | 2/2012 | Grove et al. |
| 9,135,475 B2 | 9/2015 | Lecerf et al. |
| 9,222,347 B1 | 12/2015 | Walls et al. |
| 9,658,357 B2 | 5/2017 | Kabannik et al. |
| 9,803,467 B2 | 10/2017 | Tang et al. |
| 9,909,404 B2 | 3/2018 | Hwang et al. |
| 10,001,769 B2 | 6/2018 | Huang et al. |
| 10,400,550 B2 | 9/2019 | Gu et al. |
| 10,408,029 B2 | 9/2019 | Rodrigues et al. |
| 10,641,090 B2 | 5/2020 | Felkl et al. |
| 10,677,961 B1 | 6/2020 | Chen et al. |
| 10,689,971 B2 | 6/2020 | Smith et al. |
| 10,995,609 B2 | 5/2021 | Felki et al. |
| 11,199,084 B2 | 12/2021 | Langnes et al. |
| 11,230,915 B2 | 1/2022 | Dusterhoft et al. |
| 11,319,790 B2 | 5/2022 | Potty et al. |
| 11,320,551 B2 | 5/2022 | Liu et al. |
| 11,415,716 B2 | 8/2022 | Clark et al. |
| 11,434,738 B1 | 9/2022 | Han |
| 11,518,931 B2 | 12/2022 | Duncan et al. |
| 11,608,740 B2 | 3/2023 | Moos et al. |
| 11,668,168 B2 | 6/2023 | Parsegov et al. |
| 11,702,931 B2 | 7/2023 | Inyang et al. |
| 11,704,557 B2 | 7/2023 | Moniruzzaman et al. |
| 11,708,759 B2 | 7/2023 | Jaaskelainen et al. |
| 11,753,917 B2 | 9/2023 | Shetty et al. |
| 11,753,923 B2 | 9/2023 | Dalamarinis |
| 11,762,115 B2 | 9/2023 | Quan et al. |
| 11,767,751 B2 | 9/2023 | Coenen et al. |
| 11,808,145 B2 | 11/2023 | Fripp et al. |
| 11,879,317 B2 | 1/2024 | Hunter et al. |
| 12,006,819 B2 | 6/2024 | Cramer |
| 12,037,899 B2 | 7/2024 | Swan |
| 2006/0034152 A1 | 2/2006 | Korneev et al. |
| 2007/0007003 A1 | 1/2007 | Jackson et al. |
| 2010/0314104 A1 | 12/2010 | Shokanov et al. |
| 2013/0079935 A1 | 3/2013 | Kabannik et al. |
| 2014/0222392 A1 | 8/2014 | Johnson et al. |
| 2016/0222741 A1 | 8/2016 | Lovorn et al. |
| 2016/0266276 A1 | 9/2016 | Stokely et al. |
| 2017/0342823 A1 | 11/2017 | V. et al. |
| 2018/0210105 A1 | 7/2018 | Stokely |
| 2019/0029884 A1 | 1/2019 | Jonkheere et al. |
| 2019/0129047 A1 | 5/2019 | Clark et al. |
| 2019/0136684 A1 | 5/2019 | Felkl et al. |
| 2019/0146115 A1 | 5/2019 | Mayo et al. |
| 2019/0310386 A1 | 10/2019 | Quan et al. |
| 2020/0063533 A1 | 2/2020 | Annaiyappa |
| 2020/0308958 A1 | 10/2020 | Kabannik et al. |
| 2021/0032967 A1 | 2/2021 | Dusterhoft et al. |
| 2021/0040841 A1 | 2/2021 | Dusterhoft et al. |
| 2021/0073342 A1 | 3/2021 | Razavi et al. |
| 2021/0131254 A1 | 5/2021 | Potty et al. |
| 2021/0140312 A1 | 5/2021 | Dumoit et al. |
| 2021/0189874 A1 | 6/2021 | Jaaskelainen et al. |
| 2021/0277760 A1 | 9/2021 | Stephenson et al. |
| 2021/0301657 A1 | 9/2021 | Gordon et al. |
| 2021/0302612 A1 | 9/2021 | Venkatakrishnan et al. |
| 2021/0396117 A1 | 12/2021 | Yeung et al. |
| 2021/0406792 A1 | 12/2021 | Bhardwaj et al. |
| 2022/0120173 A1 | 4/2022 | Balan et al. |
| 2022/0145742 A1 | 5/2022 | Dalamarinis et al. |
| 2022/0186605 A1 | 6/2022 | Quan et al. |
| 2022/0228484 A1 | 7/2022 | Cramer |
| 2022/0307371 A1 | 9/2022 | Swan |
| 2022/0325621 A1 | 10/2022 | Moos et al. |
| 2022/0364429 A1 | 11/2022 | Burke et al. |
| 2023/0009947 A1 | 1/2023 | Ruhle et al. |
| 2023/0066612 A1 | 3/2023 | Parsegov et al. |
| 2023/0086213 A1 | 3/2023 | Yeung et al. |
| 2023/0120763 A1 | 4/2023 | Ray |
| 2023/0147476 A1 | 5/2023 | Wheelock et al. |
| 2023/0228185 A1 | 7/2023 | Dunham et al. |
| 2023/0235635 A1 | 7/2023 | Li et al. |
| 2023/0296800 A1 | 9/2023 | Zheng et al. |
| 2023/0383639 A1 | 11/2023 | Sridhar et al. |
| 2023/0417940 A1 | 12/2023 | Rose et al. |
| 2024/0060410 A1 | 2/2024 | Gunaratne et al. |
| 2024/0077071 A1 | 3/2024 | Mu et al. |

FOREIGN PATENT DOCUMENTS

| | | |
|---|---|---|
| CA | 3034219 | 3/2023 |
| CN | 114152977 | 1/2023 |
| WO | 2009096805 | 8/2009 |
| WO | 2018022044 | 2/2018 |
| WO | 2018084871 | 5/2018 |
| WO | 2018111231 | 6/2018 |
| WO | 2021061567 | 4/2021 |

OTHER PUBLICATIONS

"U.S. Appl. No. 16/668,791 Non Final Office Action", Mar. 2, 2021, 12 pages.

Carey, et al., "Analysis of Water Hammer Signatures for Fracture Diagnostics", SPE Annual Technical Conference and Exhibition, Sep. 28-30, 2015,, 2015, 25 pages.

Chen, et al., "Research on recognition and classification of pulse signal features based on EPNCC", Scientific Reports vol. 12, Article No. 6731 (2022), 2022, 11 pages.

Cramer, et al., "Integrating Distributed Acoustic Sensing, Treatment-Pressure Analysis, and Video-Based Perforation Imaging To Evaluate Limited-Entry-Treatment Effectiveness", SPE Production and Operations, vol. 35, Issue 04, Nov. 2020, 2020, 26 pages.

Cramer, "The Application of Limited-Entry Techniques in Massive Hydraulic Fracturing Treatments", SPE Production Operations Symposium held in Oklahoma City, Oklahoma, Mar. 8-10, 1987, 1987, 18 pages.

Crump, et al., "Effects of Perforation-Entry Friction on Bottomhole Treating Analysis", JPT vol. 40, Issue 08, Aug. 1988, 1988, 8 pages.

Dung, et al., "Practical Applications of Water Hammer Analysis from Hydraulic Fracturing Treatments", SPE Hydraulic Fracturing Technology Conference and Exhibition, Virtual, May 2021, Apr. 27, 2021, 47 pages.

Dunham, et al., "Constraints on Pipe Friction and Perforation Cluster Efficiency from WaterHammer Analysis", SPE Hydraulic Fracturing Technology Conference and Exhibition, The Woodlands, Texas, USA, 31 Jan.-Feb. 2, 2023., 2023, 12 pages.

Kotthoff, "Algorithm Selection for Combinatorial Search Problems: A Survey", AI Magazine, 35 (3), 2014, 37 pages.

Long, et al., "A Perforation-Erosion Model for Hydraulic-Fracturing Applications", SPE Annual Technical Conference and Exhibition, Houston, Sep. 28-30, 2015, 2015, 15 pages.

Martins, et al., "Communication Models for Distributed Acoustic Sensing for Telemetry", IEEE Sensors Journal, vol. 17, No. 15, Aug. 1, 2017, 2017, 12 pages.

"PCT Application No. PCT/US2025/014878 International Search Report and Written Opinion", May 26, 2025, 10 pages.

"PCT Application No. PCT/US2025/014882 International Search Report and Written Opinion", May 28, 2025, 10 pages.

"PCT Application No. PCT/US2024/053767 International Search Report and Written Opinion", Feb. 21, 2025, 10 pages.

(56)         References Cited

OTHER PUBLICATIONS

"PCT Application No. PCT/US2024/053772 International Search Report and Written Opinion", Feb. 20, 2025, 10 pages.
"PCT Application No. PCT/US2024/053866 International Search Report and Written Opinion", Feb. 21, 2025, 11 pages.
"PCT Application No. PCT/US2024/054478 International Search Report and Written Opinion", Feb. 20, 2025, 9 pages.
"PCT Application No. PCT/US2024/054614 International Search Report and Written Opinion", Feb. 20, 2025, 10 pages.
"PCT Application No. PCT/US24/53771 International Search Report and Written Opinion", Feb. 25, 2025, 10 pages.
"PCT Application No. PCT/US2024/053099 International Search Report and Written Opinion", Feb. 20, 2025, 9 pages.
"PCT Application Serial No. PCT/US24/54479, International Search Report and Written Opinion", Feb. 19, 2025, 11 pages.
"U.S. Appl. No. 18/919,064 Non-Final Office Action", Sep. 5, 2025, 7 pages.
"U.S. Appl. No. 18/920,381 Non-Final Office Action", Sep. 17, 2025, 11 pages.
"U.S. Appl. No. 18/920,483 Non-Final Office Action", Sep. 25, 2025, 15 pages.

* cited by examiner

100

114
Rate

116
Rate

104
Well 2

Well 1

102

118

120

112

110

122

106

108

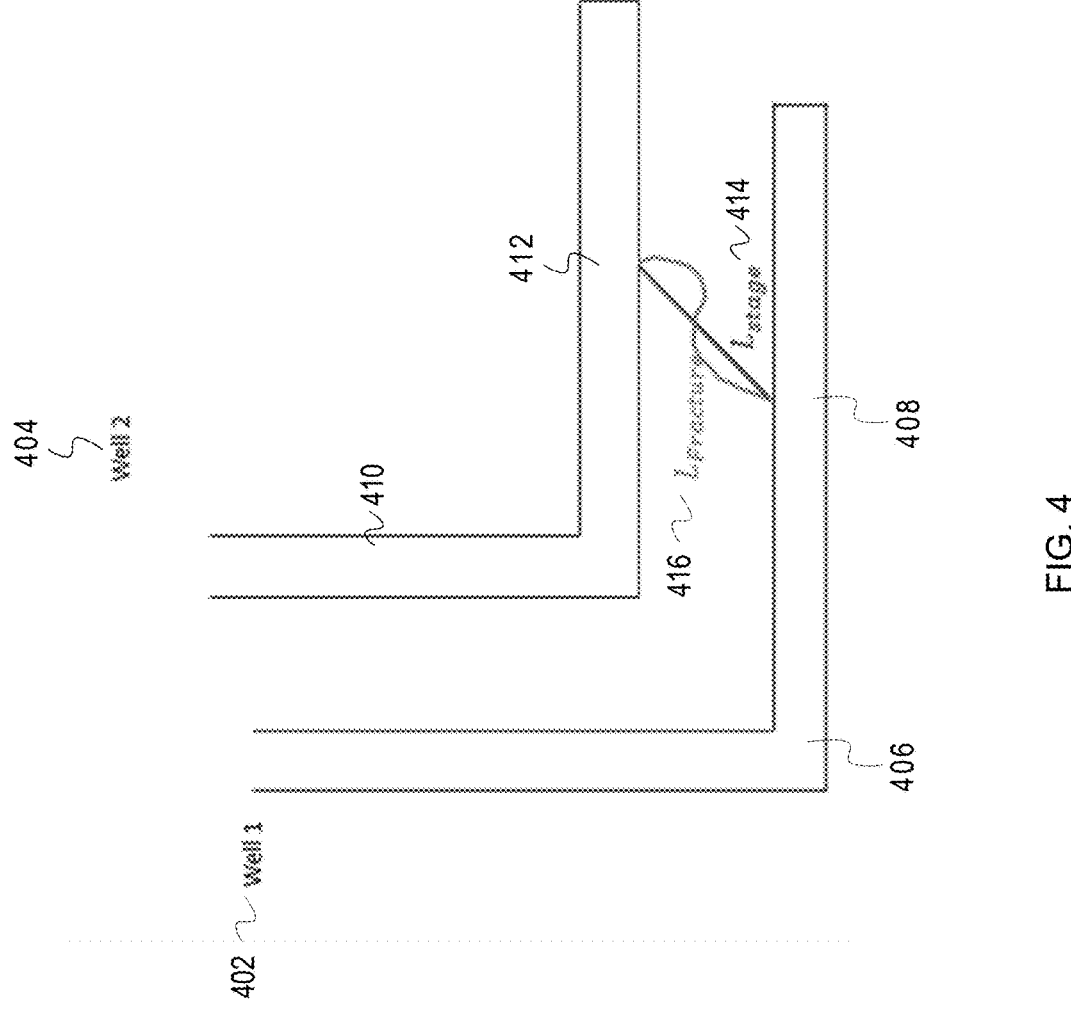
FIG. 4

600

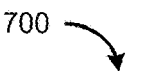

700

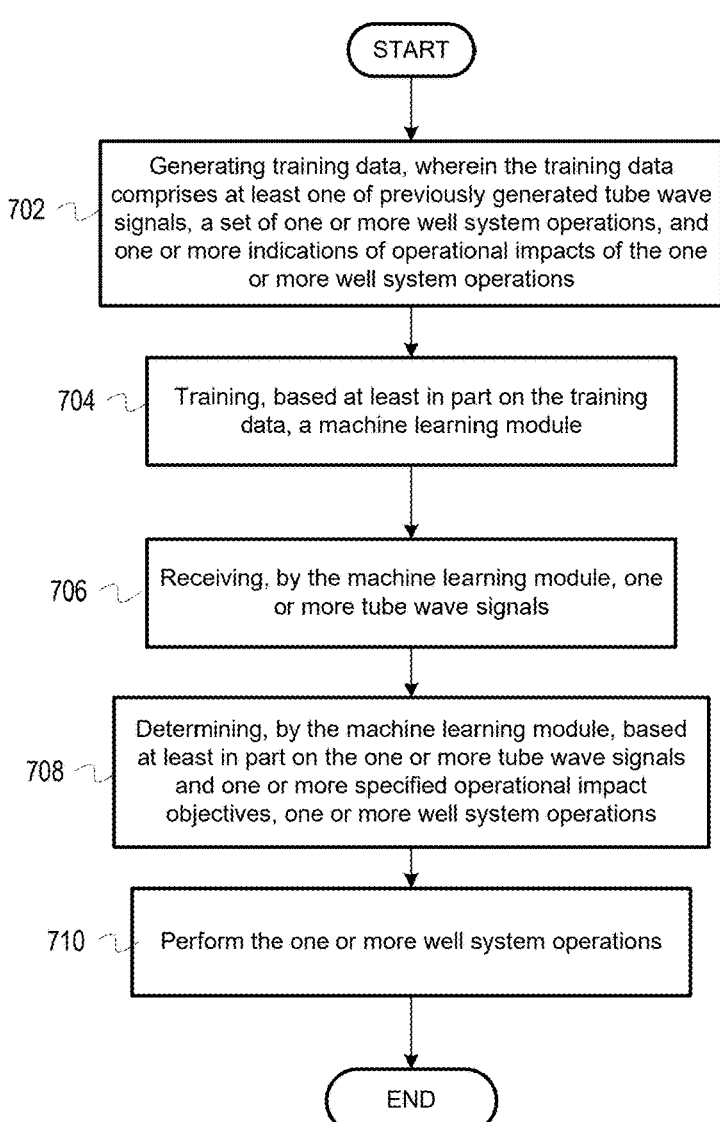

START

Generating training data, wherein the training data comprises at least one of previously generated tube wave signals, a set of one or more well system operations, and one or more indications of operational impacts of the one or more well system operations

702

Training, based at least in part on the training data, a machine learning module

704

Receiving, by the machine learning module, one or more tube wave signals

706

Determining, by the machine learning module, based at least in part on the one or more tube wave signals and one or more specified operational impact objectives, one or more well system operations

708

Perform the one or more well system operations

710

END

FIG. 7

SUBSURFACE CONDITION DETECTION USING TUBE WAVES IN A MULTI-WELL SYSTEM

BACKGROUND

Hydrocarbons and similar substances may exist in underground deposits and can be extracted by various means, such as drilling wells and using pumps to lift the substance to the surface. Tracking and measuring various aspects of the associated operations is important for maintaining and improving the operations. However, because many of the operations occur far beneath the surface of the earth, it can be difficult to determine the conditions that exist within the well and surrounding formation(s).

BRIEF DESCRIPTION OF THE DRAWINGS

Embodiments of the disclosure may be better understood by referencing the accompanying drawings.

FIG. 4 depicts an example simultaneous fracturing system and a corresponding fracture complexity, according to some implementations.

FIG. 7 is a flowchart depicting example operations for training and implementing a machine learning module for determining subsurface conditions of a multi-well system, according to some implementations.

DESCRIPTION

The description that follows includes example systems, methods, techniques, and program flows that embody aspects of the disclosure. However, it is understood that this disclosure may be practiced without these specific details. In some instances, well-known instruction instances, protocols, structures, and techniques have not been shown in detail in order not to obfuscate the description.

Because systems used to extract substances (e.g., hydrocarbons) from subsurface formations are located underground, subsurface conditions of the well and related formation can be difficult to monitor. Tube waves generated by surface equipment travel down the wellbore and tube wave reflections travel back up to the surface. Tube waves and tube wave reflections (hereinafter "tube waves") are sensitive to various subsurface conditions, including the borehole's fluid properties, integrity of the borehole wall, and properties of the formation. As such, pressure pulse technology can utilize tube waves to determine the subsurface conditions.

A tube wave can be generated passively or actively. For example, a tube wave may be generated passively when the pumping of fluid through a wellbore is stopped, causing a pressure differential that flows through the multi-well system. As another example, a tube wave may be generated actively when a pressure source, such as an air gun or electrical discharge, causes a pressure increase in the hydraulic fluid, resulting in a pressure differential that flows through the multi-well system.

Tube waves are converted into electrical signals using devices such as pressure transducers installed in a well system. Because the tube waves are sensitive to subsurface conditions, which can vary widely, the tube wave signals are complex signals that can be difficult to analyze to determine the specific conditions represented by the tube wave signal.

In simultaneous fracturing scenarios, two or more wellbores are treated at the same time instead of sequentially. The well systems corresponding to the wellbores are typically on the same pad and may be fracturing in the same formation zone or different formation zones. While each well system involved in the simultaneous fracturing usually receives similar treatment, that is not always the case and the subject matter herein is not limited to scenarios where each well system receives similar treatment. Further, a tube wave may be generated via excitation of the fluid in one or all well systems at the same time or at different times.

In some implementations, the wells may have a shared fluid line on the surface. Thus, excitation of the fluid applied to one well system may be transmitted to the other well system via the shared surface lines. In these scenarios, the tube wave response may contain the signature of both well systems. In some scenarios, the tube wave may travel between well systems via the formation.

Figure 1:
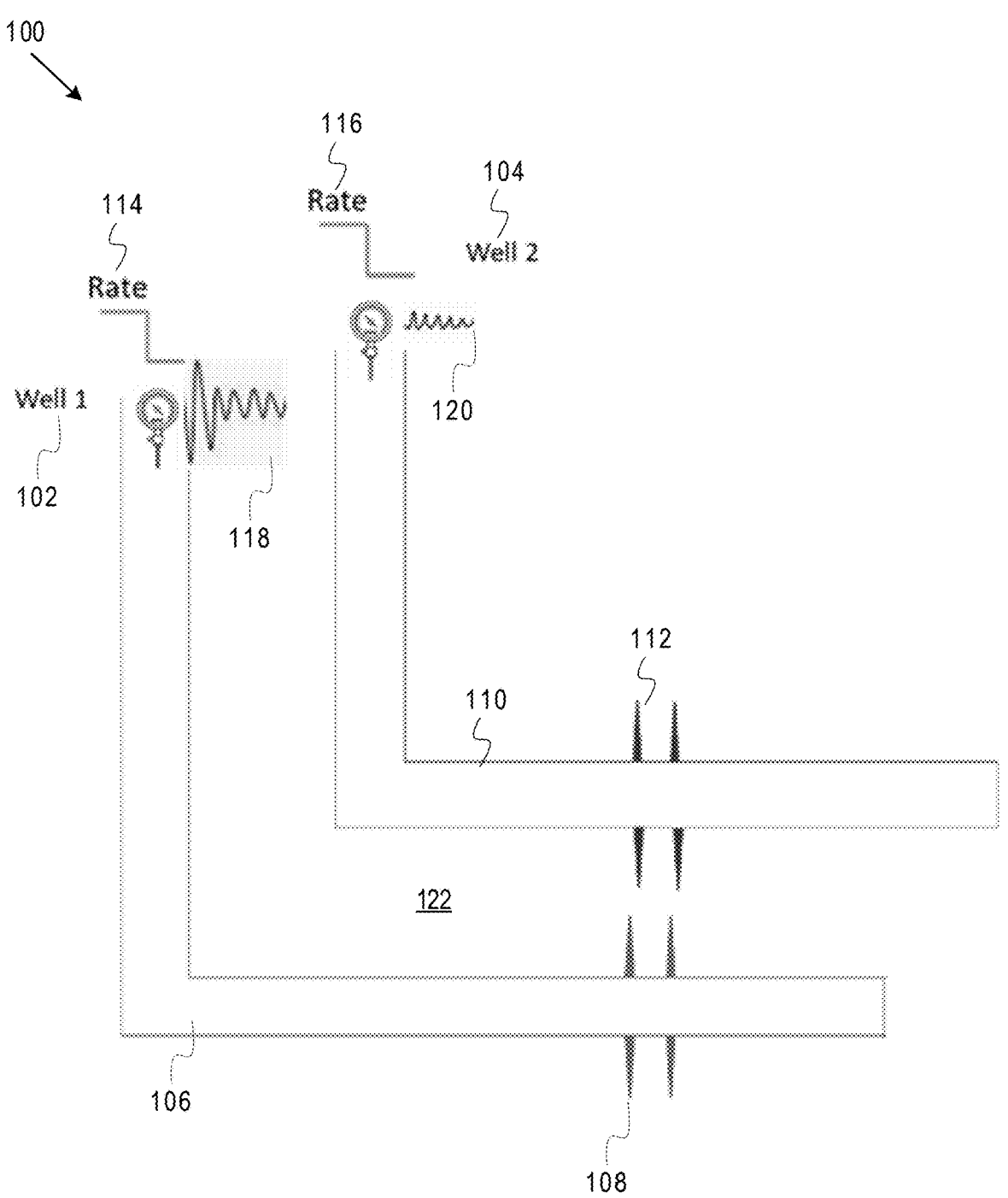
FIG. 1 depicts an example simultaneous fracturing system with a tube wave propagating from one well system to another well system, according to some implementations.

FIG. 1 depicts an example simultaneous fracturing system with a tube wave propagating from one well system to another well system, according to some implementations. In particular, FIG. 1 depicts a multi-well system 100 comprising a first well system 102 and a second well system 104. The first well system 102 comprises a first wellbore 106 with a first set of perforations 108 into a formation 122. The second well system comprises a second wellbore 110 and a second set of perforations 112 into the formation 122.

In operation, a pumping rate for one of the well systems of the multi-well system 100 is dropped, resulting in a pressure drop in one or both of the first well system 102 and the second well system 104. The first graph 114 indicates a pressure drop in the first well system 102 and the second graph 116 indicates a pressure in the second well system 104, but the pumping rate may be dropped in one well system of the multi-well system at a time. The drop in the pumping rate creates a tube wave that travels down the wellbores and is readable by a pressure gauge, pressure transducer, etc. The tube wave signature in the first well system 102 is represented by a first pressure gauge and corresponding graph of the pressure fluctuations 118 (hereinafter "third graph 118"). The tube wave signature in the second well system 104 is represented by a second pressure gauge and corresponding graph of the pressure fluctuations 120 (hereinafter "fourth graph 120").

As illustrated by the difference in amplitude and decay between the third graph 118 and the fourth graph 120, the tube wave signature in the first well system 102 is different from the tube wave signature in the second well system 104. The larger amplitude and decay depicted in the third graph 118 may suggest that the tube wave began in or closer to the first well system 102 and then propagated to the second well system 104 (e.g., through shared equipment such as a shared fluid line or through the formation 122).

Example Multi-Well System Model

A multi-well system can be modeled as discrete components, each having individual characteristics (e.g., resistance, capacitance, and inductance). The resistance of a well system or component thereof measures the resistance to the flow of a fluid through the well system or component. The capacitance of a well system or component thereof measures the ability of the well system or component to store a fluid. The inductance of a well system or component thereof is a measure of how the well system or component reacts to a change in the flow of fluid through the well system or component.

Figure 2:
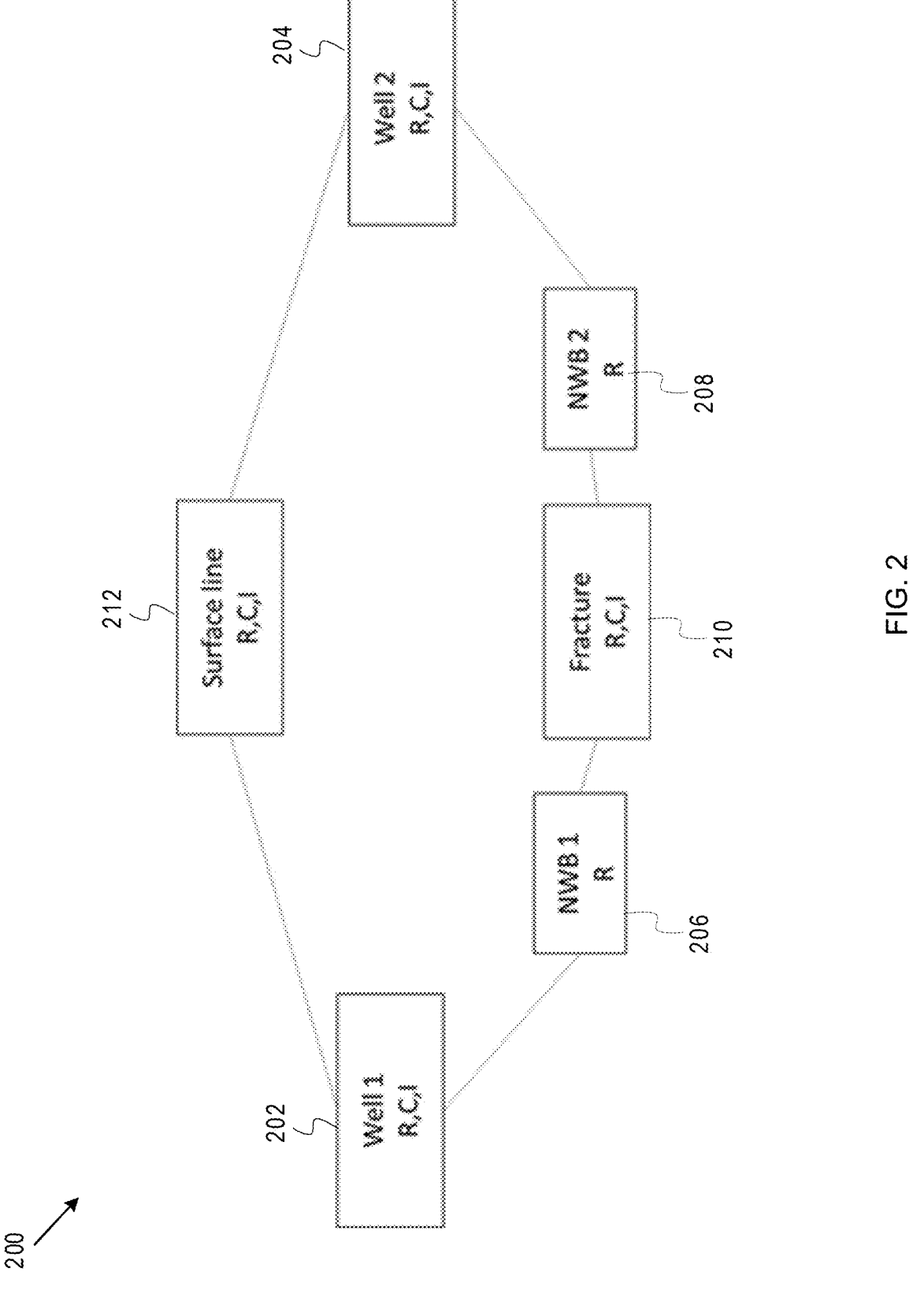
FIG. 2 depicts an example block diagram model of a multi-well system and components thereof, according to some implementations.

FIG. 2 depicts an example block diagram model of a multi-well system and components thereof, according to some implementations. FIG. 2 depicts a multi-well system 200 comprising a first well system 202 and a second well system 204. The first well system 202 includes a first wellbore 206 and the second well system 204 includes a second wellbore 208. Both of the first well system 202 and the second well system 204 have a shared fracture 210 and a shared surface line 212. Thus, the first well system 202 and the second well system 204 may be fluidly coupled via the shared fracture 210 and the surface line 212.

Each component has one or more characteristics associated with it. In particular, the first well system 202 and the second well system 204 have resistance, capacitance, and inductance. The first wellbore 206 and the second wellbore 208 have resistance. The fracture 210 and the surface line 212 have resistance, capacitance, and inductance.

The resistance, capacitance, and inductance of each well system is a combination of the resistance, capacitance, and inductance of the individual components. Because the resistance, capacitance, and inductance of the wellbore and surface line are known from their designs, the resistance, capacitance, and inductance of a fracture can be determined.

Generally, wellbores, surface lines, and fractures can be modeled using Equation 1 and Equation 2, where C is the capacitance, H is the head, t is the time, Q is the flow rate, x is the spatial dimension (e.g., measured depth), I is the inductance, R is the resistance, g is gravity, f is the friction coefficient, D is the diameter, and A is the cross-sectional area:

$$C\frac{\partial H}{\partial t} + \frac{\partial Q}{\partial x} = 0 \qquad \text{Equation 1}$$

$$I\frac{\partial H}{\partial t} + \frac{\partial H}{\partial x} + RQ = 0 \qquad \text{Equation 2}$$

$$C = \frac{gA}{a^2}, I = \frac{1}{gA}, R = \frac{f|Q|}{2gDA^2}$$

Example Tube Wave Analysis

Figure 3:
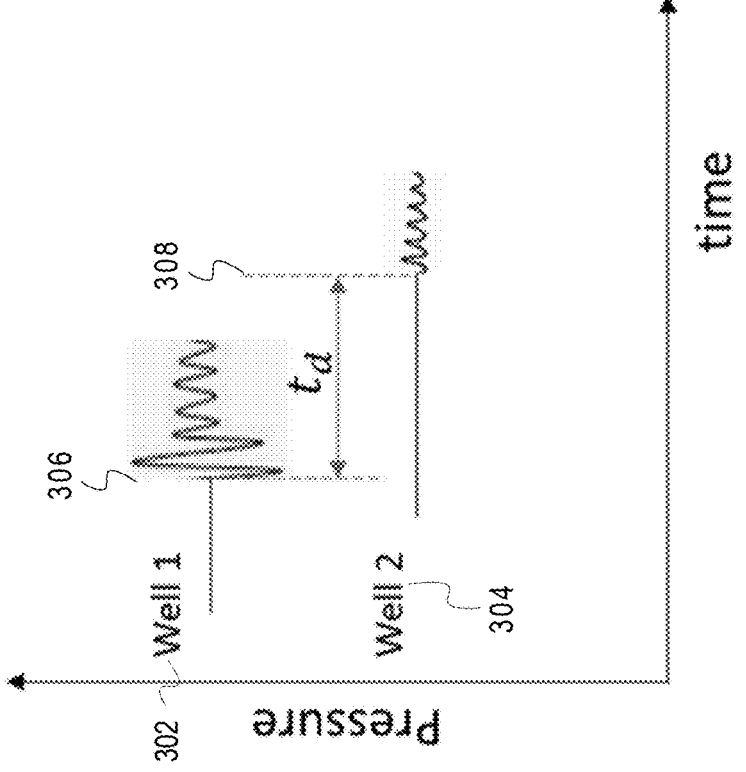
FIG. 3 depicts an example graph of the pressure fluctuations in a multi-well system caused by a tube wave, according to some implementations.

FIG. 3 depicts an example graph of the pressure fluctuations in a multi-well system caused by a tube wave, according to some implementations. In particular, FIG. 3 depicts an example graph 300 showing the relationship between pressure and time for a first well system 302 and a second well system 304. The tube wave is detected in the first well system 302 at t₁ 306 and then detected in the second well system 304 at t₂ 308. The difference between t₁ and t₂ is $t_d$.

From the time delay $t_d$ of the pressure response, two possible conclusions can be drawn. First, if $t_d$ is approximately equivalent to the length of a shared surface line divided by the wave speed of the fluid in the surface line, then the first well system 302 and the second well system 304 are likely in fluid communication via a shared surface line and may be fluidly connected via a formation. If, however, $t_d$ is greater than a particular threshold (e.g., the length of a shared surface line divided by the wave speed of the fluid in the surface line), then the first well system 302 and the second well system 304 are in fluid communication via a formation.

While example graph 300 depicts an excitation of only the first well system 302, the same analysis technique is applicable to a scenario where the first well system 302 and the second well system 304 are excited simultaneously. In a scenario where both well systems are excited at the same time, the time delay is the time between when the tube wave signature is first observed and when the tube wave signature no longer matches the tube wave signature expected for an unconnected well system.

In some implementations it may be desirable to isolate the interaction between multiple well systems fluidly coupled by a surface line (e.g., for simplicity of modeling). In such implementations, dampers may be placed within the surface lines to mitigate the interactions caused by the shared surface lines.

For illustrative purposes, the analysis can be simplified by considering a scenario where the surface lines are isolated. The time required for a tube wave to travel between two well systems via a formation can be determined using Equation 3, where $T_d$ is the time delay, $T_t$ is the travel time in the well system that generated the tube wave ("originating well system"), $T_o$ is the travel time in the non-originating well system, and $T_f$ is the travel time in the formation:

$$T_d = T_t + T_o + T_f \qquad \text{Equation 3}$$

The wave speed in geometry can be determined by Equation 4:

$$\frac{1}{a^2} = \frac{d\rho}{dP} + \frac{\rho}{A}\left(\frac{dA}{dP}\right) \qquad \text{Equation 4}$$

And for wellbores we can use Equation 5, where $K_f$ is the coefficient of stiffness, v is the Poisson's ratio, D is the inside diameter of the casing, E is the Young's modulus, and t is the thickness of the casing:

$$a^2 = \frac{1}{\frac{\rho}{K_f} + \left(1 - v^2\right)\left(\frac{\rho D}{Et}\right)} \qquad \text{Equation 5}$$

Thus, for the wellbore, Equation 3 can be transformed into Equation 6, where $T_d$ is the time delay, $D_t$ is the depth of the originating well system, $W_t$ is the wave speed of the wellbore of the originating well system, $D_o$ is the depth of the non-originating well system, $W_o$ is the wave speed of the non-originating well system, and $T_f$ is the travel time in the formation:

$$T_d = \frac{D_t}{W_t} + \frac{D_o}{W_o} + T_f \qquad \text{Equation 6}$$

The wave speed within a fracture can be approximated by the wave speed of the fracturing fluid or, if an estimate of fracture width and height is available, then the wave speed of the fracture can be determined using Equation 7, where w is the fracture width, G is the shear modulus, and $h_f$ is the fracture height:

$$a^2 = \frac{\pi w G}{2\rho h_f (1 - v^2)} \qquad \text{Equation 7}$$

Thus, given the measured time delay and other variables, the length of time the tube wave took to travel through the formation can be determined. Further, with an estimate of the wave speed of the fracture, the length of the fracture can be inferred.

Further, because the locations of the current stages in the wellbores are known, the shortest straight-line distance between the two stages can be determined. The complexity of the fracture can then be calculated as the ratio of the estimated fracture length to the shortest straight-line distance between the two stages, as illustrated in FIG. 4.

FIG. 4 depicts an example simultaneous fracturing system and a corresponding fracture complexity, according to some implementations. In particular, FIG. 4 depicts a multi-well system 400 comprising a first well system 402 and a second well system 404. The first well system 402 includes a first wellbore 406 and a first active stage 408. The second well system 404 includes a second wellbore 410 and a second active stage 412. The shortest distance between the first active stage 408 and the second active stage 412 is identified by the shortest distance length 414 and the estimated distance between the first active stage 408 and the second active stage 412 through a fracture is identified by fracture length 416.

The complexity of the fracture is defined by the deviation in length between the shortest distance length 414 and the estimated fracture length, as shown in Equation 8:

$$\text{Complexity} = \frac{L_{fracture}}{L_{stage}} \qquad \text{Equation 8}$$

Further, once the fracture length is determined, the overall expected production of the formation can be estimated using a reservoir model. In particular, utilizing the equations discussed herein, the fracture resistance can be determined. The fracture resistance can be used to infer the fracture conductivity as conductance is the inverse of resistance, which can be used along with the fracture length to determine the overall expected production, for example by using a reservoir model.

In some implementations, interaction between two well systems via a formation may be undesirable. Thus, if the signature of a tube wave generated in an originating well is detected in a non-originating well, appropriate correction measures may be taken. For example, in response to determining that a first well system and a second well system are in fluid communication via a formation, the use of particulate materials may be increased, proppant concentration may be modified, or pump rate may be altered to change the fluid path.

The impact of these operational changes can be verified using the same techniques used to determine that the well systems were in fluid communication via the formation. When the fracture interactions are decreased, the part of the tube wave signal indicating fluid connectivity diminishes. For example, the amplitude may reduce indicating reduced connectivity.

In some implementations, a downhole operation or attribute in a wellbore associated with a well system within the multi-well system may be started, modified, or updated based on detection of subsurface conditions. For example, an operation (at the surface or downhole) may be performed and/or directed to be performed to change a downhole operation or attribute based on the subsurface conditions of the multi-well system. An example of one or more downhole operations that might be performed in response to determining the subsurface conditions of the multi-well system are downhole operations to increase the complexity of a fracturing or improve the fluid communication between well systems of the multi-well system. Similarly, attributes of the operations in the wellbore may be set based on determining the efficiency of the well system. Examples of such attributes of the operations may include composition of the fluid, proppant concentration, injection rate, etc.

In some implementations, machine learning modules may be developed and used to analyze the pressure fluctuations from the tube wave to direct the operations based on varying objectives. In particular, a machine learning module that receives representations of the pressure fluctuations from tube waves ("tube wave signals") may be developed to analyze the tube wave signals from a multi-well system and determine one or more operations to perform to best achieve a particular objective, such as maximizing fracture complexity, maximizing the product of fracture conductivity and fracture complexity, or minimizing the interactions between the individual well systems of a multi-well system.

The machine learning module may further operate in an inversion mode and adapt fracture operations to reach the desired objective.

In some implementations, the analysis and operations described herein may be performed on two or more wellbores.

Example Environment

Figure 5:
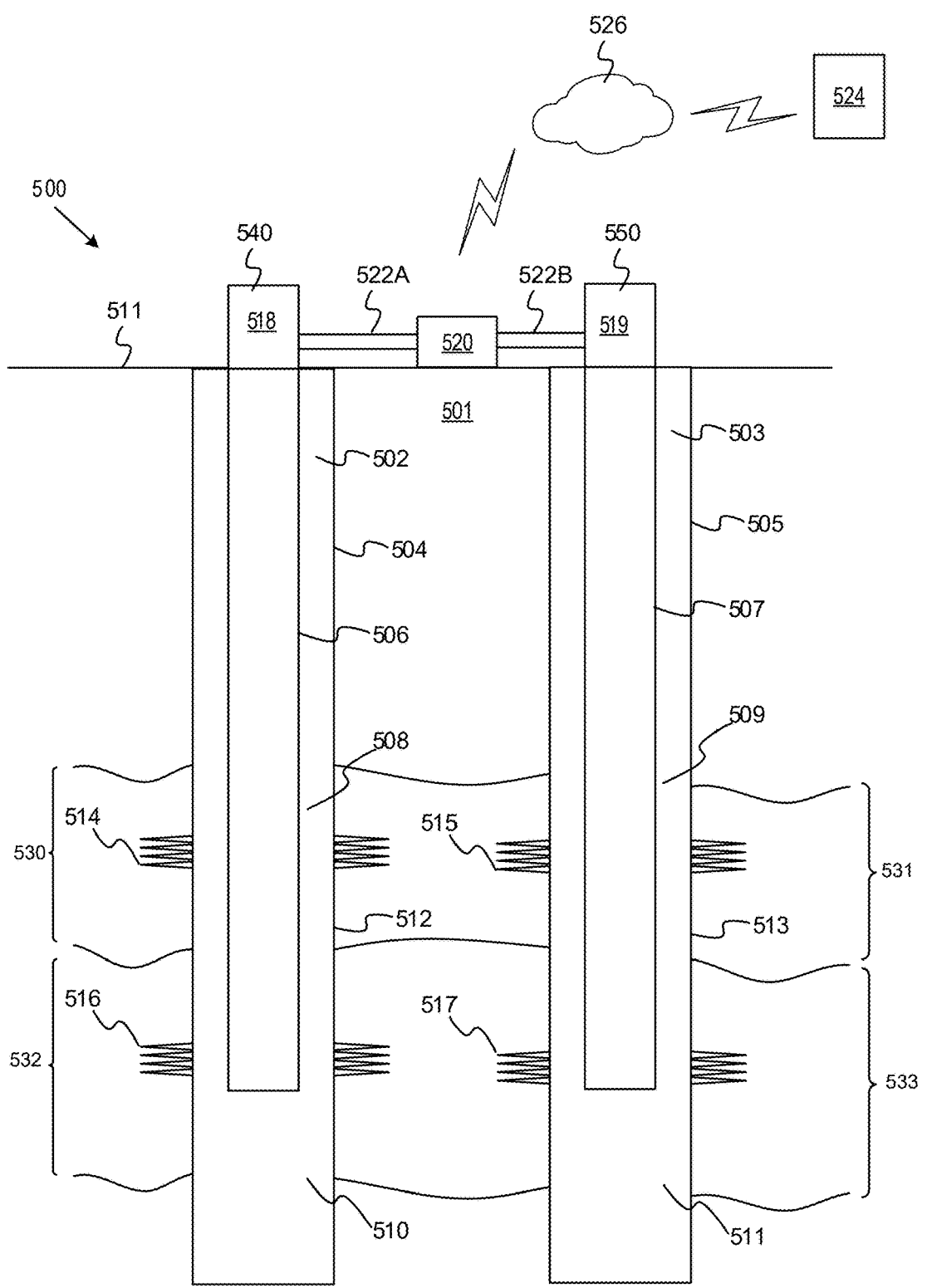
FIG. 5 is a diagrammatic illustration of an example multi-well system, according to some implementations.

FIG. 5 is a diagrammatic illustration of an example multi-well system, according to some implementations. In particular, FIG. 5 depicts a multi-well system 500 that includes a first well system 540 and a second well system 550. The first well system 540 comprises a first wellbore 502 in a formation 101. The first wellbore 502 includes a first casing 504 and a first number of perforations 514, 516 in the first casing 504. Each first set of perforations 514, 516 is made in a corresponding stage of a first set of stages 530 and 532 to allow reservoir fluids (i.e., oil, water, and gas) from the formation 101 to flow into the first wellbore 502 and into the first tubular string 506 (the production tubing). The second well system 550 comprises a second wellbore 503 in a formation 101. The second wellbore 503 includes a second casing 505 and a second number of perforations 515, 517 in the second casing 505. Each second set of perforations 515, 517 is made in a corresponding stage of a second set of stages 531 and 533 to allow reservoir fluids (i.e., oil, water, and gas) from the formation 101 to flow into the second wellbore 503 and into the second tubular string 507 (the production tubing).

The first well system 540 includes a first wellhead 518 located on a pad 511 and the second well system 550 includes a second wellhead 519 on the pad 511. The pad 511 may include a variety of equipment that varies depending on the stage of the operation, some of which may be part of the first wellhead 518 and/or second wellhead 519. For example, the pad 511 includes a pump 520 and a shared fluid line 522. The shared fluid line 522 comprises a first segment 522A extending between the pump 520 and the first wellhead 518 and a second segment 522B extending between the pump 520 and the second wellhead 519.

The multi-well system 500 also includes one or more computing systems, illustrated as computing system 524. Computing system 524 is communicatively coupled with one or more components of the multi-well system 500 via network 526. Computing system 524 may be located on the pad 511 or located at a different location off the pad 511.

Although depicted on a single pad 511 with wellbores located in a single formation 501, some multi-well systems may be split across multiple pads with wellbores in different formations or split across multiple pads and with wellbores in the same formation.

One or both of the first well system 540 and the second well system 550 may include one or more components, such as a pressure transducer and/or the computing system 524, that are configured to detect tube waves. The one or more components may also determine the time differential between when a tube wave was detected at the first well system 540 and the second well system 550, determine whether the first well system 540 and the second well system 550 are in fluid communication via the formation 501, and perform the other operations described herein for determining subsurface conditions in a multi-well system.

Example Operations

Figure 6:
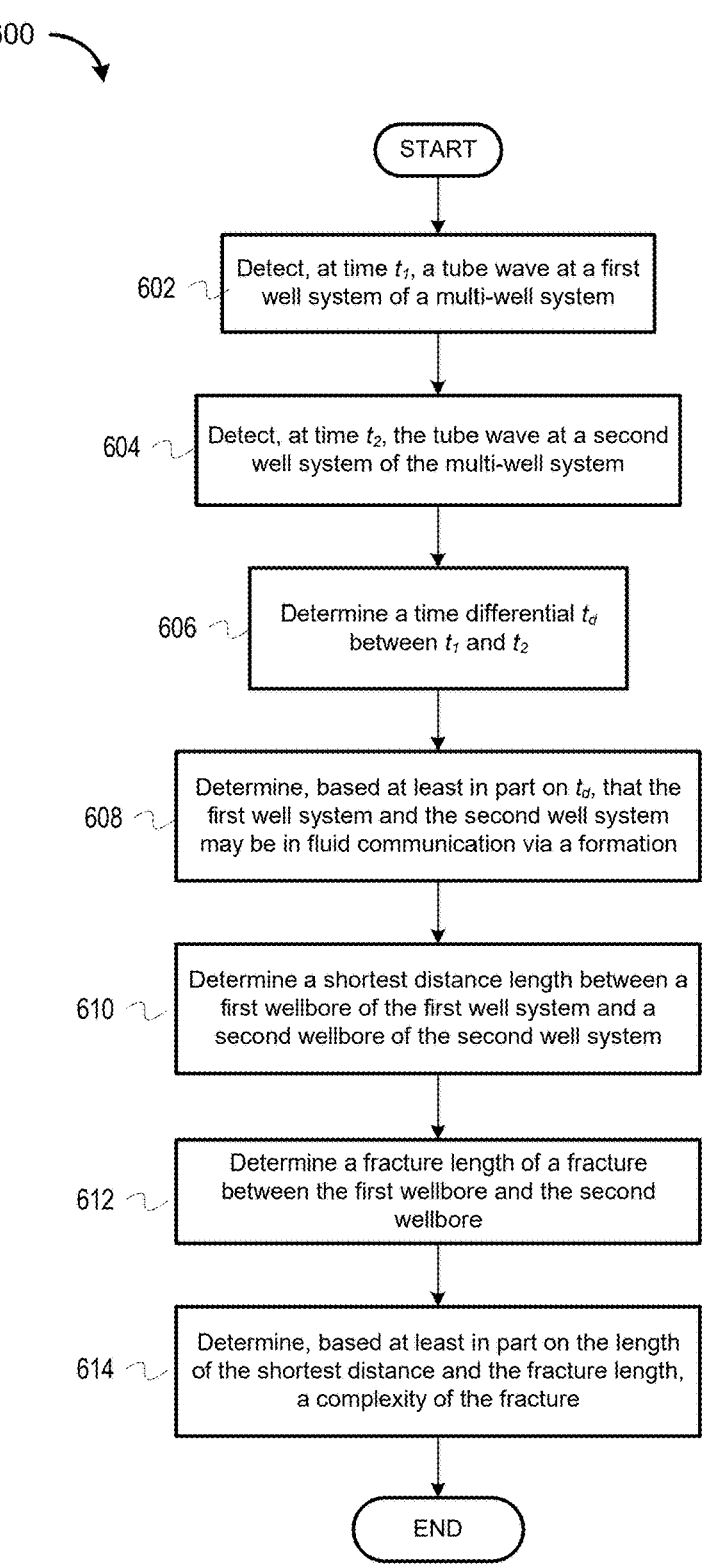
FIG. 6 is a flowchart depicting example operations for determining subsurface conditions of a multi-well system, according to some implementations.

FIG. 6 is a flowchart depicting example operations for determining subsurface conditions of a multi-well system, according to some implementations. Operations depicted in the flowchart 600 of FIG. 6 can be performed by one or more machines, one or more computing systems, software, firmware, hardware, or any combination thereof. Operations of flowchart 600 are described in reference to the figures herein. However, the operations can be adapted to other implementations. Operations of flowchart 600 start at block 602.

At block 602, a tube wave is detected at time $t_1$ at a first well system of a multi-well system. The tube wave can be detected by a computing system (e.g., the computing system 524 of FIG. 5) or any suitable component (e.g., a pressure transducer located within a well system like the first well system 540 of FIG. 5).

At block 604, the tube wave is detected at time $t_2$ at a second well system of the multi-well system. The tube wave can be detected by a computing system (e.g., the computing system 524 of FIG. 5) or any suitable component (e.g., a pressure transducer located within a well system like the second well system 550 of FIG. 5).

At block 606, a time differential $t_d$ between $t_1$ and $t_2$ is determined. The time differential can be determined by subtracting $t_1$ from $t_2$. $T_d$ can be determined by a computing system (e.g., the computing system 524 of FIG. 5) or any suitable device.

At block 608, it is determined, based at least in part on $t_d$, that the first well system and the second well system may be in fluid communication with each other. The determination that the first well and second well system may be in fluid communication with each other may be made by a computing system (e.g., the computing system 524 of FIG. 5) or any suitable device performing the operations described herein.

At block 610, a shortest distance length between a first wellbore of the first well system and a second wellbore of the second well system is determined. The shortest distance length can be determined by a computing system (e.g., the computing system 524 of FIG. 5) or any suitable device performing the operations described herein.

At block 612, a fracture length of a fracture between the first wellbore and the second wellbore is determined. The fracture length can be determined by a computing system (e.g., the computing system 524 of FIG. 5) or any suitable device performing the operations described herein.

At block 614, a complexity of the fracture is determined, based at least in part on the length of the shortest distance and the fracture length. The complexity of the fracture can be determined by a computing system (e.g., the computing system 524 of FIG. 5) or any suitable device performing the operations described herein.

FIG. 7 is a flowchart depicting example operations for training and implementing a machine learning module for determining subsurface conditions of a multi-well system, according to some implementations. Operations depicted in the flowchart 700 of FIG. 7 can be performed by one or more machines, one or more computing systems, software, firmware, hardware, or any combination thereof. Operations of flowchart 700 are described in reference to the figures herein. However, the operations can be adapted to other implementations. Operations of flowchart 700 start at block 702.

At block 702, training data is generated. The training data may comprise at least one of previously generated tube wave signals, a set of one or more well system operations, and one or more indications of operational impacts of the one or more well system operations. In some implementations, the specific data generated for training may be different. The training data may be generated by a computing system (e.g., the computing system 524 of FIG. 5) or any suitable device.

At block 704, a machine learning module is trained based, at least in part, on the training data. The training data may be generated by a computing system (e.g., the computing system 524 of FIG. 5) or any suitable device.

At block 706, one or more tube wave signals is received by the machine learning module.

At block 708, one or more well system operations are determined by the machine learning module and based, at least in part, on the one or more tube wave signals and one or more specified operational impact objectives. As discussed herein, examples of operational impact objects include minimizing interaction between well systems of a multi-well system, increased complexity of a fracturing, etc.

At block 710, the one or more well system operations are performed.

Although some of the descriptions herein refer to multi-well systems with two well systems, the operations may be adapted to multi-well systems with three or more well systems.

While the aspects of the disclosure are described with reference to various implementations and exploitations, it will be understood that these aspects are illustrative and that the scope of the claims is not limited to them. In general, techniques for detecting subsurface conditions using tube waves as described herein may be implemented with facilities consistent with any hardware system or hardware systems. Many variations, modifications, additions, and improvements are possible.

Plural instances may be provided for components, operations or structures described herein as a single instance. Further, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

The flowcharts are provided to aid in understanding the illustrations and are not to be used to limit the scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

As used herein, the term "or" is inclusive unless otherwise explicitly noted. Thus, the phrase "at least one of A, B, or C" is satisfied by any element from the set {A, B, C} or any combination thereof, including multiples of any element.

Example Computer

Figure 8:
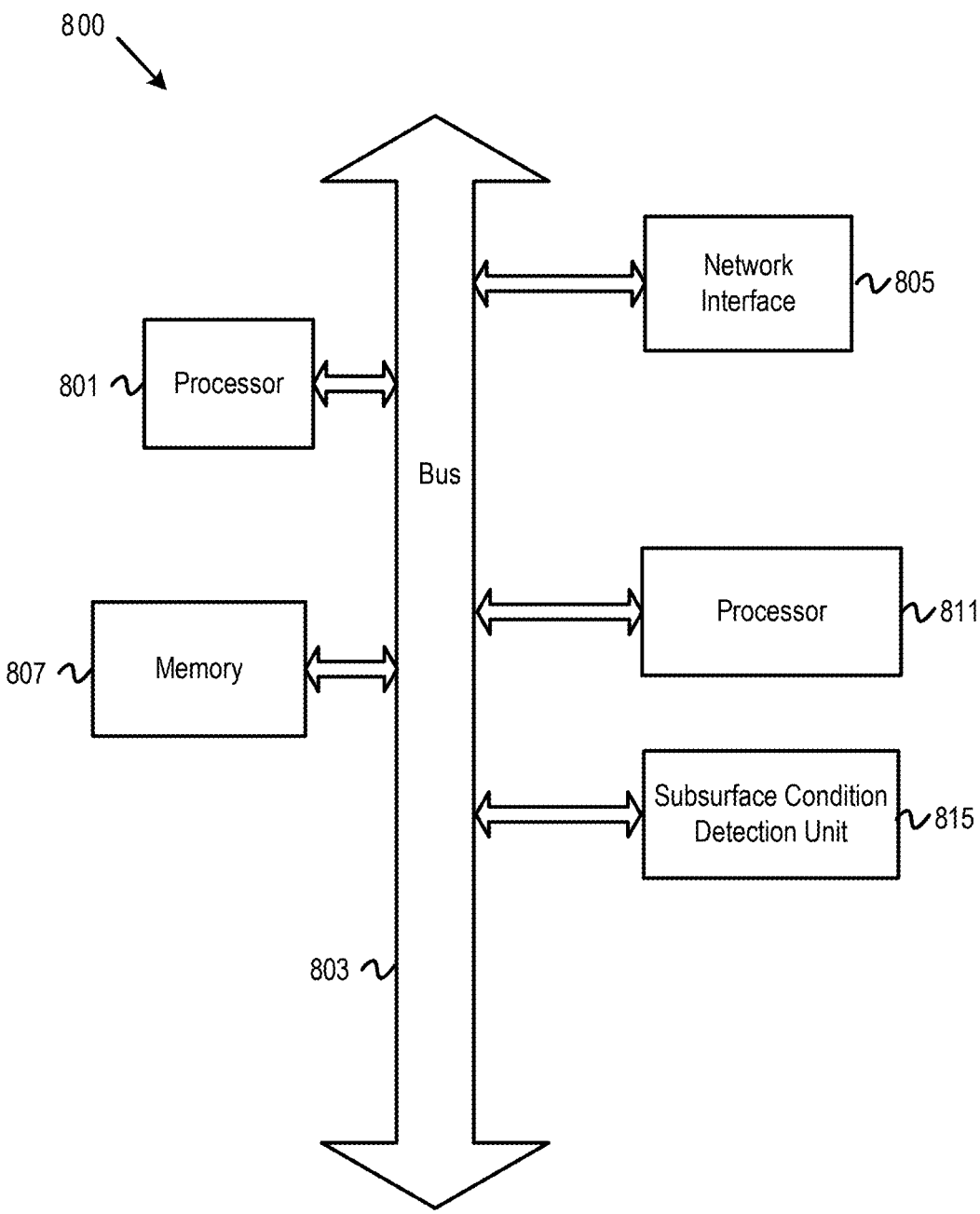
FIG. 8 is a block diagram depicting an example computer, according to some implementations.

FIG. 8 is a block diagram depicting an example computer, according to some implementations. FIG. 8 depicts a computer 800 for detecting subsurface conditions using tube waves in a multi-well system. The computer 800 includes a processor 801 (possibly including multiple processors, multiple cores, multiple nodes, and/or implementing multithreading, etc.). The computer 800 also includes a subsurface condition detection unit 815 which may perform the operations described herein. For example, the subsurface condition detection unit 815 detect a tube wave at a first well system of a multi-well system; detect the tube wave at a second well system of the multi-well system; determine a time differential between the time the tube wave was received at the first well system and the time the tube wave was received at the second well system; determine a time differential between the time the tube wave was detected at the first well system and the second well system; and determine that the first well system and the second well system are in fluid communication via a formation. Any one of the previously described functionalities may be partially (or entirely) implemented in hardware and/or on subsurface condition detection unit 815. For example, the functionality may be implemented with an application specific integrated circuit, in logic implemented in the subsurface condition detection unit 815, in a co-processor on a peripheral device or card, etc. Further, realizations may include fewer or additional components not illustrated in FIG. 8 (e.g., video cards, audio cards, additional network interfaces, peripheral devices, etc.). The processor 801 and the network interface 805 are coupled to the bus 803. Although illustrated as being coupled to the bus 803, the memory 807 may be coupled to the processor 801. The computer 800 includes memory 807. The memory 807 may be system memory or any one or more possible realizations of machine-readable media. The computer 800 can communicate via transmissions to and/or from remote devices via the network interface 805 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.).

Example Implementations

Implementation 1: A method for determining subsurface conditions in a multi-well system, the method comprising: detecting, at time $t_1$, a tube wave at a first well system of the multi-well system; detecting, at time $t_2$, the tube wave at a second well system of the multi-well system; determining a time differential $t_d$ between $t_1$ and $t_2$; and determining, based at least in part on $t_d$, that the first well system and the second well system are in fluid communication via a formation.

Implementation 2: The method of claim 1, further comprising: determining a shortest distance length between a first wellbore of the first well system and a second wellbore of the second well system; determining a fracture length of a fracture between the first wellbore and the second wellbore; and determining, based at least in part on the shortest distance length and the fracture length, a complexity of the fracture.

Implementation 3: The method according to according to any of the preceding Implementations, wherein said determining the fracture length of the fracture between the first wellbore and the second wellbore comprises: determining a first travel time of the tube wave in the first well system; determining a second travel time of the tube wave in the second well system; and determining, based at least in part on $t_d$, the first travel time, and the second travel time, a third travel time of the tube wave in the formation.

Implementation 4: The method according to any of the preceding Implementations, wherein said determining the complexity of the fracture comprises determining a ratio of the fracture length to the shortest distance length.

Implementation 5: The method according to any of the preceding Implementations, wherein determining that the first well system and the second well system are in fluid communication via the formation comprises determining that $t_d$ is greater than a threshold.

Implementation 6: The method according to any of the preceding Implementations, further comprising in response to said determining that the first well system and the second well system are in fluid communication via the formation, determining, by a machine learning module, one or more downhole operations performable to meet a pre-determined objective.

Implementation 7: The method according to any of the preceding Implementations, further comprising performing the one or more downhole operations.

Implementation 8: A multi-well system comprising: a computing system comprising: one or more processors; and one or more non-transitory computer-readable mediums including instructions which, when executed by the one or more processors, cause the one or more processors to determine subsurface conditions in the multi-well system, the instructions including: instructions to detect a tube wave at a first well system of the multi-well system, wherein a time of detection is $t_1$; instructions to detect the tube wave at a second well system of the multi-well system wherein a time of detection is $t_2$; instructions to determine a time differential $t_d$ between $t_1$ and $t_2$; and instructions to determine, based at least in part on $t_d$, that the first well system and the second well system are in fluid communication via a formation.

Implementation 9: The multi-well system of claim 8, the instructions further including: instructions to determine a shortest distance length between a first wellbore of the first well system and a second wellbore of the second well system; instructions to determine a fracture length of a fracture between the first wellbore and the second wellbore; and instructions to determine, based at least in part on the shortest distance length and the fracture length, a complexity of the fracture.

Implementation 10: The multi-well system according to any of the preceding Implementations 9, wherein the instructions to determine the fracture length of the fracture between the first wellbore and the second wellbore includes: instructions to determine a first travel time of the tube wave in the first well system; instructions to determine a second travel time of the tube wave in the second well system; and instructions to determine, based at least in part on $t_d$, the first travel time, and the second travel time, a third travel time of the tube wave in the formation.

Implementation 11: The multi-well system according to any of the preceding Implementations, wherein said instructions to determine the complexity of the fracture includes instructions to determine a ratio of the fracture length to the shortest distance length.

Implementation 12: The multi-well system according to any of the preceding Implementations, wherein the instructions further include instructions to determine, in response to a determination that the first well system and the second well system are in fluid communication via the formation, one or more downhole operations performable to meet a pre-determined objective, wherein the determination of the one or more downhole operations is made by a machine learning module.

Implementation 13: The multi-well system according to any of the preceding Implementations, further comprising: the first well system; and the second well system; wherein said instructions further include instructions to execute the one or more downhole operations on at least one of the first well system or the second well system.

Implementation 14: One or more non-transitory computer-readable mediums including instructions which, when executed by a processor, cause the processor to determine subsurface conditions in a multi-well system, the instructions comprising: instructions to detect a first tube wave at a first well system of the multi-well system, wherein a time of detection is $t_1$; instructions to detect the first tube wave at a second well system of the multi-well system, wherein a time of detection is $t_2$; instructions to determine a first time differential $t_{d1}$ between $t_1$ and $t_2$; and instructions to determine, based at least in part on $t_{d1}$, that the first well system and the second well system are in fluid communication via a formation.

Implementation 15: The one or more non-transitory computer-readable mediums of claim 14, the instructions further including: instructions to determine a shortest distance length between a first wellbore of the first well system and a second wellbore of the second well system; instructions to determine a fracture length of a fracture between the first wellbore and the second wellbore; and instructions to determine, based at least in part on the shortest distance length and the fracture length, a complexity of the fracture.

Implementation 16: The one or more non-transitory computer-readable mediums according to any of the preceding Implementations, wherein the instructions to determine the fracture length of the fracture between the first wellbore and the second wellbore includes: instructions to determine a first travel time of the first tube wave in the first well system; instructions to determine a second travel time of the first tube wave in the second well system; and instructions to determine, based at least in part on $t_{d1}$, the first travel time, and the second travel time, a third travel time of the first tube wave in the formation.

Implementation 17: The one or more non-transitory computer-readable mediums according to any of the preceding Implementations, wherein the instructions to determine the complexity of the fracture includes instructions to determine a ratio of the fracture length to the shortest distance length.

Implementation 18: The one or more non-transitory computer-readable mediums according to any of the preceding Implementations, wherein the instructions further include instructions to determine, in response to a determination that the first well system and the second well system are in fluid communication via the formation, one or more downhole operations performable to meet a pre-determined objective, wherein the determination of the one or more downhole operations is made by a machine learning module.

Implementation 19: The one or more non-transitory computer-readable mediums according to any of the preceding Implementations, wherein the instructions further include: instructions to execute the one or more downhole operations on at least one of the first well system or the second well system; instructions to generate a second tube wave in at least one of the first well system or the second well system; instructions to detect the second tube wave at the first well system of the multi-well system, wherein the time of detection is $t_3$; instructions to detect the second tube wave at the second well system of the multi-well system, wherein the time of detection is $t_4$; instructions to determine a time differential $t_{d2}$ between $t_3$ and $t_4$; and instructions to determine, based at least in part on $t_{d2}$, whether the one or more downhole operations were successful.

Implementation 20: The one or more non-transitory computer-readable mediums according to any of the preceding Implementations, wherein the instructions further include: instructions to generate training data comprising a set of sample data, wherein each sample data of the set of sample data comprises at least one previously generated tube wave signal, a set of one or more well system operations, and one or more indications of operational impacts of the one or more well system operations; and instructions to train the machine learning module based, at least in part, on the training data.

The invention claimed is:

1. A method for determining subsurface conditions in a multi-well system, the method comprising:
   detecting, at time $t_1$, a tube wave at a first well system of the multi-well system;
   detecting, at time $t_2$, the tube wave at a second well system of the multi-well system;
   determining a time differential $t_d$ between $t_1$ and $t_2$; and determining, based at least in part on $t_d$, that the first well system and the second well system are in fluid communication via a formation.

2. The method of claim 1, further comprising:

determining a shortest distance length between a first wellbore of the first well system and a second wellbore of the second well system;

determining a fracture length of a fracture between the first wellbore and the second wellbore; and determining, based at least in part on the shortest distance length and the fracture length, a complexity of the fracture.

3. The method of claim 2, wherein said determining the fracture length of the fracture between the first wellbore and the second wellbore comprises:

determining a first travel time of the tube wave in the first well system;

determining a second travel time of the tube wave in the second well system; and determining, based at least in part on $t_d$, the first travel time, and the second travel time, a third travel time of the tube wave in the formation.

4. The method of claim 2, wherein said determining the complexity of the fracture comprises determining a ratio of the fracture length to the shortest distance length.

5. The method of claim 1, wherein determining that the first well system and the second well system are in fluid communication via the formation comprises determining that $t_d$ is greater than a threshold.

6. The method of claim 1, further comprising in response to said determining that the first well system and the second well system are in fluid communication via the formation, determining, by a machine learning module, one or more downhole operations performable to meet a pre-determined objective.

7. The method of claim 6, further comprising performing the one or more downhole operations.

8. A multi-well system comprising:

a computing system comprising:

one or more processors; and one or more non-transitory computer-readable mediums including instructions which, when executed by the one or more processors, cause the one or more processors to determine subsurface conditions in the multi-well system, the instructions including:

instructions to detect a tube wave at a first well system of the multi-well system, wherein a time of detection is $t_1$;

instructions to detect the tube wave at a second well system of the multi-well system wherein a time of detection is $t_2$;

instructions to determine a time differential $t_d$ between $t_1$ and $t_2$; and instructions to determine, based at least in part on $t_d$, that the first well system and the second well system are in fluid communication via a formation.

9. The multi-well system of claim 8, the instructions further including:

instructions to determine a shortest distance length between a first wellbore of the first well system and a second wellbore of the second well system;

instructions to determine a fracture length of a fracture between the first wellbore and the second wellbore; and instructions to determine, based at least in part on the shortest distance length and the fracture length, a complexity of the fracture.

10. The multi-well system of claim 9, wherein the instructions to determine the fracture length of the fracture between the first wellbore and the second wellbore includes:

instructions to determine a first travel time of the tube wave in the first well system;

instructions to determine a second travel time of the tube wave in the second well system; and instructions to determine, based at least in part on $t_d$, the first travel time, and the second travel time, a third travel time of the tube wave in the formation.

11. The multi-well system of claim 9, wherein said instructions to determine the complexity of the fracture includes instructions to determine a ratio of the fracture length to the shortest distance length.

12. The multi-well system of claim 8, wherein the instructions further include instructions to determine, in response to a determination that the first well system and the second well system are in fluid communication via the formation, one or more downhole operations performable to meet a pre-determined objective, wherein the determination of the one or more downhole operations is made by a machine learning module.

13. The multi-well system of claim 12, further comprising:

the first well system;

the second well system; and wherein said instructions further include instructions to execute the one or more downhole operations on at least one of the first well system or the second well system.

14. One or more non-transitory computer-readable mediums including instructions which, when executed by a processor, cause the processor to determine subsurface conditions in a multi-well system, the instructions comprising:

instructions to detect a first tube wave at a first well system of the multi-well system, wherein a time of detection is $t_1$;

instructions to detect the first tube wave at a second well system of the multi-well system, wherein a time of detection is $t_2$;

instructions to determine a first time differential $t_{d1}$ between $t_1$ and $t_2$; and instructions to determine, based at least in part on $t_{d1}$, that the first well system and the second well system are in fluid communication via a formation.

15. The one or more non-transitory computer-readable mediums of claim 14, the instructions further including:

instructions to determine a shortest distance length between a first wellbore of the first well system and a second wellbore of the second well system;

instructions to determine a fracture length of a fracture between the first wellbore and the second wellbore; and instructions to determine, based at least in part on the shortest distance length and the fracture length, a complexity of the fracture.

16. The one or more non-transitory computer-readable mediums of claim 15, wherein the instructions to determine the fracture length of the fracture between the first wellbore and the second wellbore includes:

instructions to determine a first travel time of the first tube wave in the first well system;

instructions to determine a second travel time of the first tube wave in the second well system; and instructions to determine, based at least in part on $t_{d1}$, the first travel time, and the second travel time, a third travel time of the first tube wave in the formation.

17. The one or more non-transitory computer-readable mediums of claim 15, wherein the instructions to determine the complexity of the fracture includes instructions to determine a ratio of the fracture length to the shortest distance length.

18. The one or more non-transitory computer-readable mediums of claim 15, wherein the instructions further include instructions to determine, in response to a determination that the first well system and the second well system are in fluid communication via the formation, one or more downhole operations performable to meet a pre-determined objective, wherein the determination of the one or more downhole operations is made by a machine learning module.

19. The one or more non-transitory computer-readable mediums of claim 18, wherein the instructions further include:

instructions to execute the one or more downhole operations on at least one of the first well system or the second well system;

instructions to generate a second tube wave in at least one of the first well system or the second well system;

instructions to detect the second tube wave at the first well system of the multi-well system, wherein the time of detection is $t_3$;

instructions to detect the second tube wave at the second well system of the multi-well system, wherein the time of detection is $t_4$;

instructions to determine a time differential $t_{d2}$ between $t_3$ and $t_4$; and instructions to determine, based at least in part on $t_{d2}$, whether the one or more downhole operations were successful.

20. The one or more non-transitory computer-readable mediums of claim 18, wherein the instructions further include:

instructions to generate training data comprising a set of sample data, wherein each sample data of the set of sample data comprises at least one previously generated tube wave signal, a set of one or more well system operations, and one or more indications of operational impacts of the one or more well system operations; and instructions to train the machine learning module based, at least in part, on the training data.

* * * * *